3,729,412
SLUDGE CONCENTRATION
Robert Carl MacKenzie, Sarnia, Ontario, Canada, assignor to Polymer Corporation Limited, Sarnia, Ontario, Canada
No Drawing. Filed Mar. 19, 1971, Ser. No. 126,351
Claims priority, application Canada, Aug. 31, 1970, 91,963
Int. Cl. C02b 1/20
U.S. Cl. 210—52        10 Claims

ABSTRACT OF THE DISCLOSURE

A process is provided for the dewatering of a sludge derived from the treatment of an industrial waste water stream, wherein the sludge is mixed with a latex comprising rubbery polymer and, on addition of a coagulating agent, a coagulum is formed which is separable from the aqueous phase.

---

This invention relates to a secondary waste treatment process for the conditioning for dewatering or, in other words for increasing the solids content, of a watery sludge, said sludge being derived from a waste water stream, and to the separation of said solids from the aqueous phase.

In the commercial manufacture of synthetic polymeric materials, water has a multi-purpose use including acting as a heat transfer medium, a means of separating polymeric materials from non-polymeric materials and acting as a dispersing medium for various materials which are not soluble in water. All of these operations require that the recovered water be adequately treated for the removal or reduction in concentration of foreign components before the water stream can be re-used or returned to, for example, a municipal stream. Finely divided suspended materials in water are generally removed by containing the water in a confined space for a suitable period of time to allow the contained suspended material to concentrate on the top of the water, from where it may be removed, or to settle to the bottom of the confining system, in which case the supernatant water is usually removed. In order to improve the settling process, various flocculating agents are added which, through the action of the floc of high surface area, facilitate the coalescence and settling of the suspended particles. By such means, the time for settling of the suspended materials can be reduced. The settling process results in the ability to separate a higher grade water stream and the formation of a more concentrated suspended solid material in water usually known as a sludge. The economic handling of such a sludge, which is usually in the form of a fluid slurry, usually requires it to be further dewatered before it can be finally disposed of. Dewatering may be attempted by filtration or screening processes, by centrifugation, compaction or flotation but these are of limited application frequently due to the nature of the sludge even after conditioning of the sludge with the various water-soluble polymers of the art. Dewatering, or concentration of the solids in the sludge, prior to the final disposal, is thus known to present considerable technical difficulty and requires the expenditure of considerable energy even to achieve a solids increase to about 15–20 percent by weight which is, generally, not as high as is desirable for the most suitable forms of final disposal which include land fill and incineration, the latter being limited by the nature of the components which form the sludge.

An objective of this invention is the economic removal of the essentially non-free settling suspended polymeric material from an industrial water stream. A further statement of the objective is the separation of said suspended material into a handleable, more compact form which is more suitable for disposal.

The objectives of this invention are achieved in a process wherein the suspended polymeric material is admixed with a latex and, on addition of a coagulant, is readily coagulated to permit the removal of the majority of the solid material from the water phase. The water stream containing the suspended material is usually comprised of materials from the coagulation of polymeric compounds and it was thus surprising to discover that said suspended material, although derived from said coagulation of polymeric compounds and not having been coagulated and separated thereby, was readily coagulated in the presence of a small amount of a latex.

This invention provides a process for the concentration of the solids of a sludge derived from waste water which comprises mixing (a) an aqueous sludge containing at least 0.5 weight percent of suspended solids, said solids being substantially polymeric materials, with (b) a latex containing more than about 0.5 weight percent of rubbery polymeric solids and (c) a coagulating agent whereby an isolatable coagulum is formed containing said suspended polymeric material and said rubbery polymeric solids, and separating said coagulum from the aqueous phase, said separated coagulum containing at least 25 weight percent solids. The aqueous sludge (a) may be the effluent from any industrial process wherein water is contacted with polymeric materials, which effluent has undergone primary treatment for the removal of the more readily separable materials and has undergone a secondary waste treatment to yield the aqueous sludge which is an essentially non-free settling suspension.

In the commercial manufacture of synthetic polymeric materials waste water streams are obtained from the coagulation of latices, the aqueous recovery of solution polymers and the production of oil and black masterbatches. Such streams are contaminated with residual quantities of polymeric and non-polymeric solids and oils and are heterogeneous mixtures of such materials in water. These recovered waste water streams may undergo primary settling and separaton and the solids can be further concentrated, e.g. through the use of added chemicals, to yield a further water stream and a sludge.

The aforementioned sludge, which is a fluid slurry in form, needs to be further concentrated prior to economic disposal. In accordance with this invention, admixture of this sludge with a latex, which may also be but is not necessarily a waste from a latex-producing plant, is placed in a container wherein the mixture is simultaneously subjected to mild agitation, such as may be accomplished by any convenient means including but not limited to large slowly rotating paddles and effervescing gases, to provide homogeneous distribution between the latex stream and the sludge, followed by coagulation with coagulating agent yields a readily separable solid material. The latex stream of this invention is a dispersion in water of a polymer of an olefinically unsaturated compound, preferably a rubbery polymer of a $C_4$–$C_8$ conjugated diolefin and optionaly polymerizable substituted ethylene compound prepared in an emulsion polymerization system. Representative of lactices that can be be used in this invention are styrene-butadiene latex, acrylonitrile-butadiene latex, carboxylated styrene-butadiene latex, carboxylated acrylonitrile-butadiene latex, isoprene-acrylonitrile latex, butadiene-styrene-vinyl pyridine latex, polybutadiene latex, polyisoprene latex, and mixtures thereof. Latices made with anionic emulsifiers are preferred. The latex stream contains at least 0.5 weight percent and preferably at least 1 weight percent to about 40 weight percent of rubbery polymeric solids.

The solids contents of the sludge and of the latex may be quite variable and not necessarily amenable to control. In the conventional methods of handling such materials, control is usually by volume measurement. Thus the sludge and the latex may be mixed by volume and the volume ratio is such that the solids content ratio, for the sludge to latex, is from about 10:1 to about 1:5.

The coagulating agent of this invention includes the mineral acids and inorganic salts such as calcium chloride, aluminum chloride and the like. The coagulating agent is selected in a commercial operation on the basis of cost and effectiveness. In the preferred embodiment of this invention, sulphuric acid is used as the coagulating agent. Also in the preferred embodiment, sufficient acidic coagulating agent is added to cause a final pH in the mixture of not more than 2.5 which leads to the formation during coagulation of uniform particles of such a size that can be readily separated from the aqueous phase.

The mixing of the sludge and the latex and the coagulation with the coagulating agent may conveniently be achieved in a single vessel. Mixing of these components takes place preferably under conditions of mild agitation such that the rate of shear is low. The residence time in the mixing vessel or vessels wherein coagulation occurs should be at least five minutes and preferably from ten to fifteen minutes up to a maximum dictated by the size of the equipment and the volume throughput. The temperature at which the sludge, the latex and the coagulating agent are mixed is not critical except that it should be within the temperature range known in the art for the handling of such aqueous materials and may be in the range of from about 50° F. to about 150° F. The coagulum formed by the admixture of the sludge, the latex and the coagulating agent is readily separated from the water phase by any of the known means including vibrating screens, mechanical filtration and centrifugation.

In the preferred embodiments of this invention, the sludge contains at least 0.5 weight percent, preferably at least 1 weight percent, solids and the solids may go as high as 10 weight percent. The sludge has been treated with chemicals so that the pH of the sludge is in the range 6.5–8.5 and preferably 7–8. Such chemicals may include aluminum sulphate and lime to form flocculants and to maintain the pH in the desired range. The fluocculation process may be accelerated by the addition of flocculating aids such as high molecular weight polyacrylamide. The composition of the solids of the sludge is extremely variable by the nature of being derived from waste water streams which have been utilized in a manufacturing facility which is capable of producing a wide range of synthetic polymers. The organic material content of the sludge solids may be within the range of 40–90 weight percent, the inorganic content within the range 10–40 weight percent and the carbon black content within the range 0–30 weight percent. In the most preferred embodiment of this invention the sludge, the latex and the coagulating agent are mixed, and the subsequent separation steps are carried out, continuously using a chain of two vessels. The coagulated mixture is passed to equipment for the separation of the solid material from the aqueous phase, which equipment is preferably a vibrating screen separator equipped with a screen of mesh size 100 or smaller mesh size. The solid material or coagulum separated at this stage contains at least 25 weight percent solids and is suitable for disposal as land fill. The separated coagulum in the form of a solid material, may also be further dewatered to less than about 20 percent by weight of residual water prior to disposal in suitable form including baled shapes. The aqueous phase, after separation from the coagulum, may be re-used as a process water stream and contains less than 0.1 weight percent, and preferably less than 0.05 weight percent, of suspended solid material.

The following examples illustrate, but are not limiting on, the invention.

EXAMPLE 1

In a 1.5 litre glass jar were added the quantities of sludge as specified in Table I, followed by addition of the noted amounts of latex. The sludge was obtained as a result of the conventional treatment of a waste water stream said stream originating from an industrial facility for the manufacture of synthetic polymers. The sludge contained 3.0 weight percent solids and comprised a mixture of suspended carbon black particles, suspended colloidal particles of styrene-butadiene polymers, suspended colloidal particles of butadiene-acrylonitrile polymers and fine coagulum derived from the manufacture of the aforementioned styrene-butadiene and butadiene-acrylonitrile polymers. The latex comprised a rubbery styrene-butadiene polymer and contained 1.5 weight percent solids. The mixture was gently agitated by slow manual rotation of an inserted rod while there was added 60 mls. of 15 weight percent sulphuric acid. The agitation was continued for about 3 minutes and the mixture was then allowed to stand for a further ten minutes. After this period of time the mixture was decanted onto a laboratory vibrating screen separator.

TABLE I

| Experiment number | 1 | 2 | 3 |
|---|---|---|---|
| Latex volume (mls.) (1.5 weight percent solids) | 100 | 225 | 330 |
| Sludge volume (mls.) (3.0 weight percent solids) | 500 | 375 | 240 |
| Weight ratio of sludge/latex solids | 10:1 | 3:3:1 | 1.45:1 |
| pH of serum after addition of 60 mls. $H_2SO_4$ | 1.7 | 1.6 | 1.5 |
| Recovered solids | (1) | (1) | (2) |
| Suspended solids of recovered water (weight percent) | 0.023 | | 0.022 |

[1] Medium sized crumb, easily screened.
[2] Large sized crumb, easily screened.

The results recorded in Table I show that the separation of the coagulum from the aqueous phase was very good: the recovered water contained a suspended solids level of only about 0.02 weight percent. The coagulum was easily separated from the aqueous phase in the form of a wet but relatively firm material.

EXAMPLE 2

Continuous operating facilities were used to remove the solids from an aqueous sludge. As recorded in Table II, the sludge contained 1.4 weight percent solids and was of a similar nature to that described in Example 1. Two latices of styrene-butadiene rubber were used in this example. The latex used in Run 1 contained 1.2 weight percent solids and the latex of Run 2 contained only 0.66 weight percent of latex solids. The sludge and the latex were added to two mixing tanks in series, each tank being of about 10 gallons capacity and equipped with a four-bladed paddle rotated at 20–28 r.p.m. to provide good mixing. Sulphuric acid was also added to the first such mixing tank. The average total residence time in the two tanks was 15–20 minutes for the flow rates as shown in Table II for the sludge, latex and sulphuric acid. The coagulated product from the second mixing tank was passed to a vibrating screen separator and the separated solid product and separated water stream were collected.

TABLE II

| Run number | 1 | 2 |
|---|---|---|
| Latex flow, gallons/minute | 0.56 | 0.60 |
| Sludge flow, gallons/minute | 0.27 | 0.24 |
| Weight ratio of sludge/latex solids | 0.56:1 | 0.85:1 |
| Sulphuric acid flow, gallons/minute | 0.10 | 0.03 |
| Sulphuric acid strength, weight percent | 3.3 | 5.0 |
| pH of serum after addition of acid | 1.7 | 1.7 |
| Recovered solids: | | |
| (a) Weight percent | 31.7 | 30.5 |
| (b) Nature | (1) | (1) |
| Suspended solids of recovered water (weight percent) | 0.005 | 0.011 |

[1] Fine crumb.

The results presented in Table II show that the separation of solid matter from the aqueous phase was very good. The solid matter was isolated in the form of a fine, readily separable crumb of more than 30% solids content and the recovered water contained about 0.01% and less of residual suspended solids.

What is claimed is:

1. A process for the concentration of the solids of a sludge derived from waste water which comprises mixing (a) an aqueous sludge containing at least 0.5 weight percent of suspended solids, said solids being substantially polymeric material, with (b) a latex containing more than about 0.5 weight percent of rubbery polymeric solids and (c) a coagulating agent selected from the mineral acids, calcium chloride and aluminum chloride whereby an isolatable coagulum is formed containing said suspended polymeric material and said rubbery polymeric solids, and separating said coagulum from the aqueous phase, said separated coagulum containing at least 25 weight percent solids.

2. The process according to claim 1 wherein the separated aqueous phase contains less than 0.05 weight percent of suspended solid material.

3. The process according to claim 1 wherein said aqueous sludge (a), latex (b) and coagulating agent (c) are mixed for at least five minutes.

4. The process according to claim 1 wherein the latex is an anionic latex and the coagulating agent is a mineral acid.

5. The process according to claim 1 wherein the aqueous sludge (a) has a pH of 6.5–8.5.

6. The process according to claim 5 wherein the coagulating agent is sulphuric acid used in an amount sufficient to cause a pH of not more than 2.5.

7. The process according to claim 1 wherein the volume ratio of aqueous sludge (a) to latex (b) is such that the solids content ratio is from about 10:1 to about 1:5.

8. The process according to claim 1 wherein the latex (b) contains at least 0.75 weight percent solids and comprises a rubbery polymer of a $C_4$–$C_8$ conjugated diolefin or mixtures of said rubbery polymers.

9. The process according to claim 1 wherein the mixing and the separating steps are carried out continuously.

10. The process according to claims 1 or 3 wherein the separated coagulum is dewatered to less than about 20 percent by weight of residual water.

References Cited

UNITED STATES PATENTS

| | | | |
|---|---|---|---|
| 3,485,752 | 12/1969 | Eck et al. | 210—54 |
| 3,632,507 | 1/1972 | Witt | 210—54 |
| 3,493,501 | 2/1970 | Eck | 210—54 |
| 3,453,207 | 7/1969 | Eck et al. | 210—53 X |

MICHAEL ROGERS, Primary Examiner